(12) United States Patent
Shimizu (10) Patent No.: US 11,946,706 B2
(45) Date of Patent: Apr. 2, 2024

(54) METHOD OF MANUFACTURING DEHUMIDIFIER, DEHUMIDIFICATION ELEMENT, AND DEHUMIDIFIER INCLUDING DEHUMIDIFICATION ELEMENT

(71) Applicant: Mitsubishi Electric Corporation, Tokyo (JP)

(72) Inventor: Akinori Shimizu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/274,481

(22) PCT Filed: Feb. 19, 2021

(86) PCT No.: PCT/JP2021/006295
§ 371 (c)(1),
(2) Date: Jul. 27, 2023

(87) PCT Pub. No.: WO2022/176149
PCT Pub. Date: Aug. 25, 2022

(65) Prior Publication Data
US 2023/0408212 A1   Dec. 21, 2023

(51) Int. Cl.
*B01D 53/02* (2006.01)
*B01D 53/26* (2006.01)
(Continued)

(52) U.S. Cl.
CPC ............... *F28F 3/02* (2013.01); *B01D 53/26* (2013.01); *F28F 21/08* (2013.01)

(58) Field of Classification Search
CPC .............. F28F 3/02; F28F 21/08; B01D 53/26
See application file for complete search history.

(56) References Cited

U.S. PATENT DOCUMENTS

| 5,879,764 A | 3/1999 | Chu et al. |
| 2005/0255285 A1 | 11/2005 | Uchibori et al. |
| (Continued) | | |

FOREIGN PATENT DOCUMENTS

| CN | 105953632 A | 9/2016 |
| JP | S55-121398 A | 9/1980 |
| (Continued) | | |

OTHER PUBLICATIONS

International Search Report and Written Opinion dated Apr. 27, 2021, received for PCT Application PCT/JP2021/006295, filed on Feb. 19, 2021, 12 pages including English Translation.
(Continued)

*Primary Examiner* — Christopher P Jones
(74) *Attorney, Agent, or Firm* — XSENSUS LLP (57) ABSTRACT

Dehumidification elements are arranged on a surface of a fin included in a heat exchange member such that the dehumidification elements are dotted, and are fixed to the surface of the fin. The dehumidification elements each includes: a plurality of hygroscopic materials having a fine particle shape or a fine fiber shape; and a binder formed to bind the plurality of hygroscopic materials together. The dehumidification element is configured such that a mixture of the plurality of hygroscopic materials and the binder is formed in the shape of a pellet.

7 Claims, 4 Drawing Sheets

(51) Int. Cl.
*F28F 3/02* (2006.01)
*F28F 21/08* (2006.01)

(56) References Cited

U.S. PATENT DOCUMENTS

| | | | |
|---|---|---|---|
| 2007/0204979 | A1 | 9/2007 | Matsushita et al. |
| 2009/0126397 | A1 | 5/2009 | Sueoka et al. |
| 2009/0217526 | A1 | 9/2009 | Mittelbach et al. |
| 2009/0242177 | A1* | 10/2009 | Morioka ............... C09D 127/18 524/1 |
| 2014/0020413 | A1 | 1/2014 | Sauerbeck et al. |
| 2016/0334145 | A1 | 11/2016 | Pahwa et al. |
| 2019/0257532 | A1* | 8/2019 | Sakabe ................. F24F 1/0067 |

FOREIGN PATENT DOCUMENTS

| | | | |
|---|---|---|---|
| JP | S56-016097 | A | 2/1981 |
| JP | S59-007897 | A | 1/1984 |
| JP | H03-094809 | A | 4/1991 |
| JP | H07-265649 | A | 10/1995 |
| JP | H08-187429 | A | 7/1996 |
| JP | H09-189459 | A | 7/1997 |
| JP | 2005-283061 | A | 10/2005 |
| JP | 2007-010181 | A | 1/2007 |
| JP | 2008-526502 | A | 7/2008 |
| JP | 2008-533422 | A | 8/2008 |
| JP | 2016-121871 | A | 7/2016 |
| JP | 2017-508121 | A | 3/2017 |
| WO | 2004/006628 | A1 | 1/2004 |
| WO | 2020/022127 | A1 | 1/2020 |

OTHER PUBLICATIONS

Notice of Reasons for Refusal dated Oct. 12, 2021, received for JP Application 2021-538794, 8 pages including English Translation.
Decision to Grant dated Jan. 4, 2022, received for JP Application 2021-538794, 5 pages including English Translation.
Office Action dated Nov. 29, 2023 issued in corresponding CN patent application No. 202180093654.1 (and English translation). 16 pages.

* cited by examiner

METHOD OF MANUFACTURING DEHUMIDIFIER, DEHUMIDIFICATION ELEMENT, AND DEHUMIDIFIER INCLUDING DEHUMIDIFICATION ELEMENT

CROSS-REFERENCE TO RELATED APPLICATION

The present application is based on PCT filing PCT/JP2021/006295, filed Feb. 19, 2021, the entire contents of which are incorporated herein by reference.

TECHNICAL FIELD

The present disclosure relates to a method of manufacturing a dehumidifier that adsorbs and desorbs moisture in air, a dehumidification element, and a dehumidifier including dehumidification elements.

BACKGROUND ART

In the past, dehumidifiers including a hygroscopic material that adsorbs and desorbs moisture in air to control humidity have been known. For example, Patent Literature 1 discloses a dry dehumidifier in which a hygroscopic material is caused to adsorb moisture to reduce humidity. In this dry dehumidifier, the hygroscopic material is applied as coating onto a heat exchange member including a heat exchange tube and a plurality of fins fitted to the heat exchange tube. The dry dehumidifier is configure such that air to be treated and removed is caused to flow over an outer side of the heat exchange tube, and is thus brought into contact with the hygroscopic material, and in addition, refrigerant is caused to flow through the heat exchange tube. As a result, moisture in the air is adsorbed and removed by the hygroscopic material, and the air is thus dehumidified. When adsorbing moisture, the hygroscopic material generates heat, and the temperature of the hygroscopic material thus rises. However, the heat of the hygroscopic material is received by refrigerant that flows through the heat exchange tube, and the temperature of the hygroscopic material is thus prevented from excessively rising.

In Patent Literature 1, as acrylic adhesive binder is applied as coating onto the entire outer peripheral surface of the heat exchange tube and the entire surfaces of the fins, and silica gel particles are embedded in the binder which has changed to have a film shape, thereby forming a hydroscopic material. Alternatively, silica gel powder is kneaded along with water glass, and kneaded material obtained thereby is applied as coating onto the outer peripheral surface of the heat exchange tube and the surfaces of the fins, and thereafter, the water glass is dried and fixed to the outer peripheral surface of the heat exchange tube and the surfaces of the fins, thereby forming a hygroscopic material. That is, the hygroscopic material disclosed in Patent Literature 1 is formed in the shape of a film that covers the entire outer peripheral surface of the heat exchange tube and the entire surfaces of the fins.

CITATION LIST

Patent Literature

Patent Literature 1: Japanese Unexamined Patent Application Publication No. 7-265649

SUMMARY OF INVENTION

Technical Problem

However, in the dehumidifier disclosed in Patent Literature 1, in the case where moisture absorption and moisture desorption are repeated for a long period of time, there is a risk that a crack will occur in the hygroscopic material having a film shape, due to a change in volume of particles, such as silica gel, which is made by such moisture absorption and moisture desorption. As a result, in this dehumidifier, there is a possibility that part of the hygroscopic material will peel off from the outer peripheral surface of the heat exchange tube and the surfaces of the fins, as a result of which the moisture absorption performance of the hygroscopic material is lowered.

The present disclosure is applied to solve the above problems, and relates to a method of manufacturing a dehumidifier that can provide a stable moisture absorption performance for a long period of time without lowering the moisture absorption performance even when moisture absorption and moisture desorption are repeated, and also to a dehumidification element and a dehumidifier including dehumidification elements.

Solution to Problem

A method of manufacturing a dehumidifier according to one embodiment of the present disclosure is a method of manufacturing a dehumidifier provided with a heat exchange member including a fin. The method includes: mixing hygroscopic materials and a binder together, the hygroscopic materials having a fine particle shape or a fine fiber shape, the binder being formed to bind the hygroscopic materials together; molding a plurality of mixed bodies by applying pressure to a mixture of the hygroscopic materials and the binder and by cutting the mixture into the plurality of mixed bodies; producing dehumidification elements each formed in the shape of a pallet, by drying the plurality of mixed bodies; and arranging the dehumidification elements on a surface of the fin such that the dehumidification elements are dotted, and fixing the dehumidification elements on the surface of the fin.

Dehumidification elements according to another embodiment of the present disclosure are dehumidification elements arranged on a surface of a fin included in a heat exchange member such that the dehumidification elements are dotted, and fixed to the surface of the fin. Each of the dehumidification elements includes: a plurality of hygroscopic materials having a fine particle shape or a fine fiber shape; and a binder formed to bind the plurality of hygroscopic materials together. In each of the dehumidification elements, a mixture of the plurality of hygroscopic materials and the binder is formed in the shape of a pellet.

A dehumidifier according to still another embodiment of the present disclosure includes the above dehumidification elements and a heat exchange member including a fin. The dehumidification elements are arranged on a surface of the fin and are fixed to the surface of the fin.

Advantageous Effects of Invention

In order that the dehumidification elements of the embodiment of the present disclosure be arranged in a spotted pattern on the surface of each of the fins included in the heat exchanger member and fixed to the surface of the fin, a mixture of the hygroscopic materials and the binder is formed in the shape of a pellet. To be more specific, in the dehumidification elements arranged in a spotted pattern, voids are provided between adjacent ones of the dehumidification elements, whereby even when the volume of the hygroscopic materials changes due to moisture absorption and moisture desorption, it is possible to reduce interference between the adjacent dehumidification elements. Furthermore, the dehumidification element is formed in the shape of a pellet, and is thus small in profile. Thus, even when the volume of the hygroscopic materials changes, a crack does not easily occur. Therefore, it is possible to keep the dehumidification elements fixed to the surface of the fin and thus to ensure a stable moisture absorption performance for a long period of time without lowering the moisture absorption performance even when moisture absorption and moisture desorption are repeated.

DESCRIPTION OF EMBODIMENTS

Embodiments of the present disclosure will be described with reference to drawings. In each of figures in the drawings, components and elements that are same as or equivalent to those in a previous figure or previous figures are denoted by the same reference signs, and after they are each explained once, theirs descriptions will thus be omitted or simplified as appropriate. Regarding the components and elements as illustrated in each figure, the shapes, sizes, and arrangement of the components and elements, etc., can be modified as appropriate.

Embodiment 1

Figure 1:
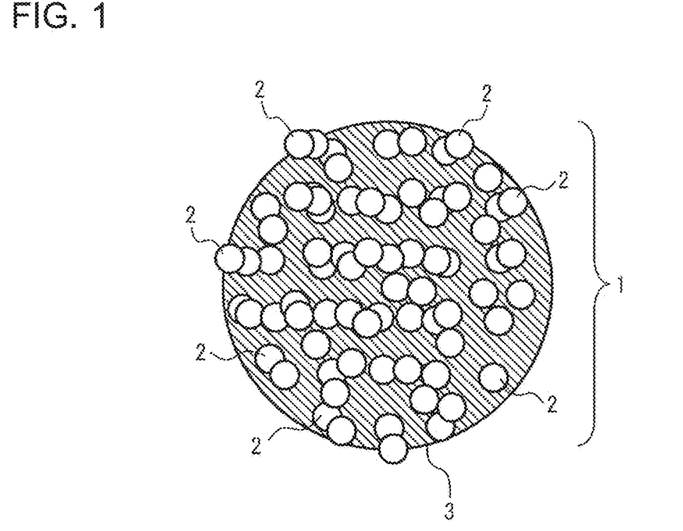
FIG. 1 is an explanatory view schematically illustrating a dehumidification element according to Embodiment 1.

First of all, a dehumidification element 1 according to Embodiment 1 will be described with reference to FIG. 1. FIG. 1 is an explanatory view schematically illustrating the dehumidification element according to Embodiment 1. The dehumidification element 1 according to Embodiment 1 is used as a dehumidifying material for a commercial air conditioner, a household air conditioner, an air conditioners for automobile, a refrigerator truck platform, a cold storage, or a refrigerator, for example.

As illustrated in FIG. 1, the dehumidification element 1 according to Embodiment 1 includes a plurality of hygroscopic materials 2 and a binder 3, and is configured such that a mixture of the hygroscopic materials 2 and the binder 3 is formed in the shape of a pellet. The plurality of hygroscopic materials 2 have a fine particle shape or a fine fiber shape, and adsorb moisture in air. The binder 3 binds the plurality of hygroscopic materials 2 together.

In order to increase the speed of moisture absorption, preferably, each of the hygroscopic materials 2 should have a fine particle shape and thus a small particle diameter. This is because in a hygroscopic material 2 having a large particle diameter, absorbed moisture is not easily transferred to a central portion of the hygroscopic material 2, and the speed of moisture absorption is low. It should be noted that the shape of the hygroscopic material 2 is not limited to the fine particle shape, and may be a fine fiber shape or a plate shape, for example. Also, it is preferable that the material of the hygroscopic material 2 be an organic polymer sorbent, such as polyacrylic acid salt. An organic polymer sorbent is a material that is obtained by bringing an organic polymer main chain having hydrophilic polar groups in a molecule into a three-dimensional structure with a cross-linked structure, and that sorbs a large amount of water vapor based on a sorption phenomenon. As water molecules are absorbed in the organic polymer sorbent having a three-dimensional structure, the organic polymer sorbent expands, and thus adsorbs a large number of water molecules. As water molecules are released from the organic polymer sorbent, the organic polymer sorbent contracts, and its structure returns to the original structure. That is, the organic polymer sorbent has a three-dimensional structure, and thus has appropriate flexibility and its volume greatly changes at the time of adsorption and desorption. It should be noted that the material of the hygroscopic material 2 is not limited to the organic polymer sorbent, and may be an inorganic material, such as silica gel or zeolite.

In order for the binder 3 to follow the expansion and contraction of the hygroscopic material 2, preferably, the binder 3 should be made of material having elasticity, such as a silicone based material, a urethane based material, an ethyl acetate (EA) based material, or an acrylic based material. However, the binder 3 may be made of material having high rigidity, such as an epoxy based material or a resin based material.

It is appropriate that the mixing ratio between the hygroscopic materials 2 and the binder 3 is 0.1 to 0.5 equivalents of the binder 3 to 1 equivalent of the hygroscopic materials 2 in weight ratio. The hygroscopic materials 2 are covered by the binder 3, whereby the moisture absorption performance does not greatly lower, and in addition, the shape of the hygroscopic materials 2 is held. It should be noted that the mixing ratio between the hygroscopic materials 2 and the binder 3 is not limited to the above ratio.

In the above dehumidification element 1, the mixture of the binder 3 and the hygroscopic materials 2 having a fine particle shape or a fine fiber shape is formed in the shape of a pellet. Thus, moisture easily reaches the center portion of each of the hygroscopic materials 2 and the speed of moisture absorption is improved.

Figure 2:
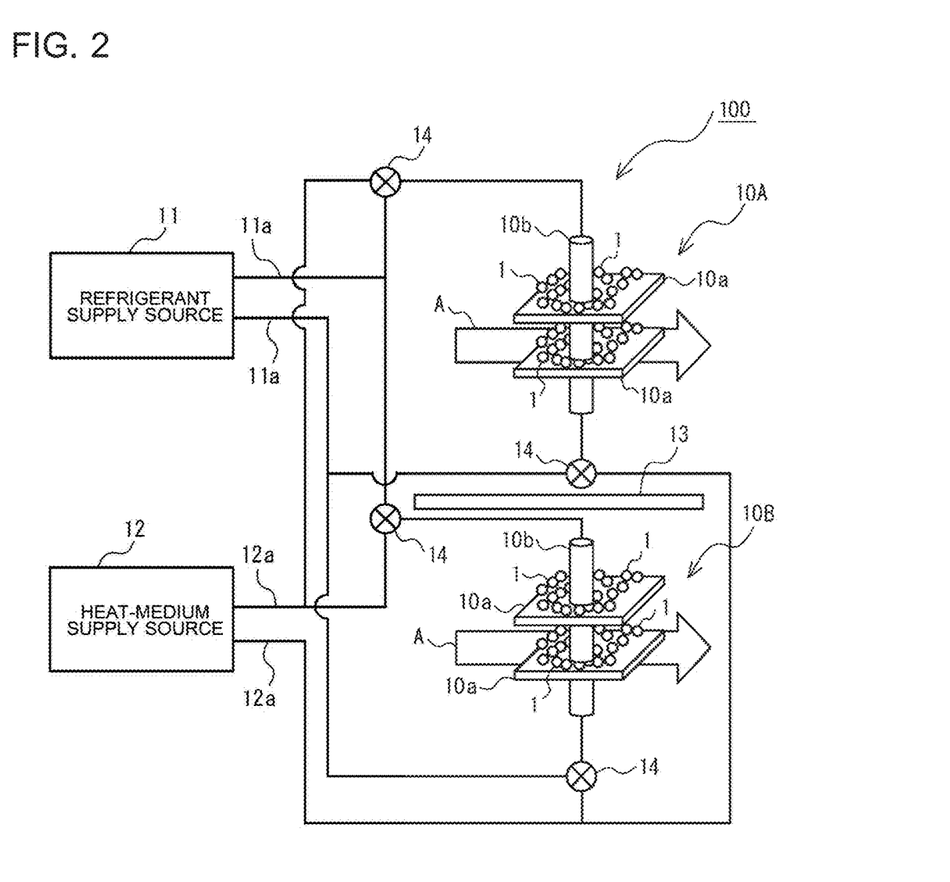
FIG. 2 is an explanatory view schematically illustrating the entire configuration of a dehumidifier including dehumidification elements according to Embodiment 1.
Figure 3:
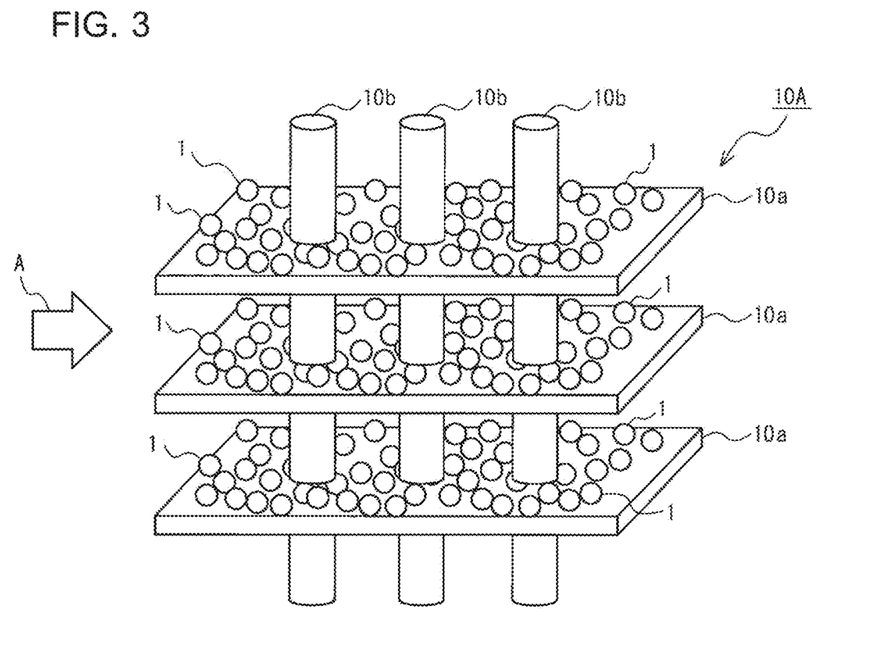
FIG. 3 is an explanatory view schematically illustrating a heat exchange member of the dehumidifier of Embodiment 1.
Figure 4:
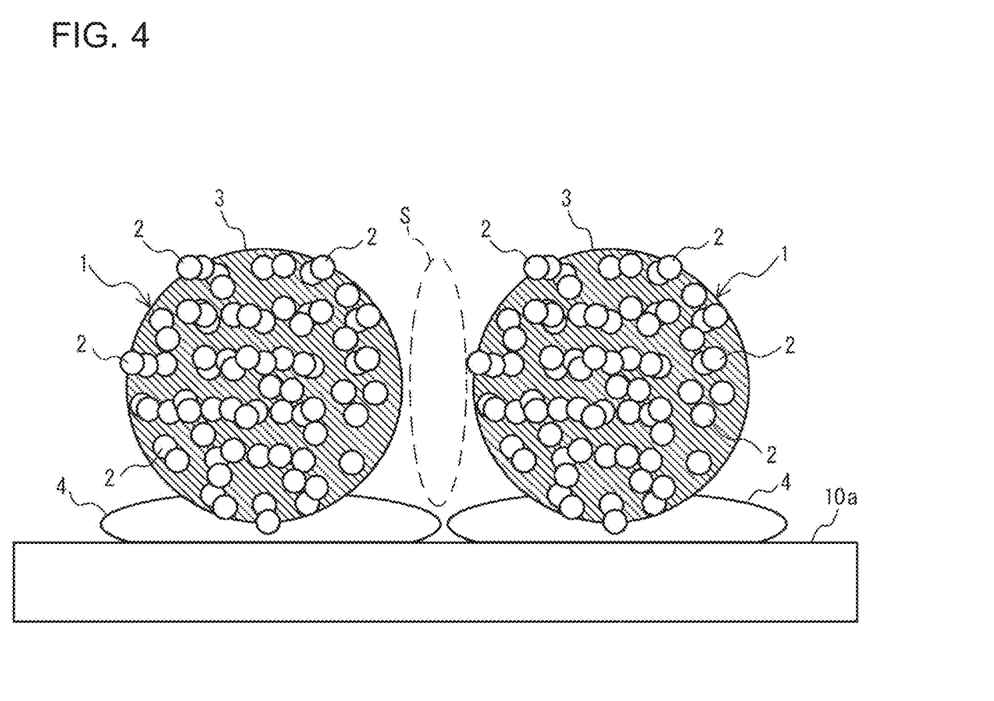
FIG. 4 is an explanatory view schematically illustrating a state in which the dehumidification elements according to Embodiment 1 are fixed to the surface of a fin of the heat exchange member.
Figure 5:
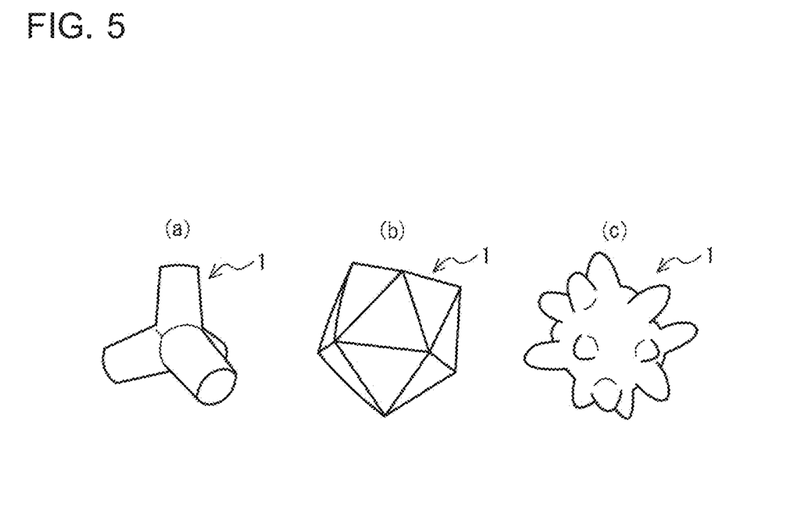
FIG. 5 is an explanatory view illustrating one example of an irregular surface of the dehumidification element according to Embodiment 1.

Next, a dehumidifier 100 including the dehumidification elements 1 according to Embodiment 1 will be described with reference to FIG. 2 to FIG. 4. FIG. 2 is an explanatory view schematically illustrating the entire configuration of the dehumidifier including dehumidification elements according to Embodiment 1. FIG. 3 is an explanatory view schematically illustrating a heat exchange member of the dehumidifier of Embodiment 1. FIG. 4 is an explanatory view schematically illustrating a state in which the dehumidification elements according to Embodiment 1 are fixed to a surface of a fin of the heat exchange member. FIG. 5 is an explanatory view illustrating one example of an irregular surface of the dehumidification element according to Embodiment 1. It should be noted that although FIG. 2 illustrates heat exchange members 10A and 10B in a simplified manner as a matter of convenience for illustration, each of the heat exchange members 10A and 10B has the same configuration as the heat exchange member 10A as illustrated in FIG. 3.

The dehumidifier 100 as illustrated in FIG. 2 includes two heat exchange members 10A and 10B, a refrigerant supply source 11, and a heat medium supply source 12. The refrigerant supply source 11 supplies a cooling medium, and the heat medium supply source 12 supplies a heat medium. The two heat exchange members 10A and 10B are installed while being airtightly isolated from each other by a partition member 13. Since the two heat exchange members 10A and 10B have the same configuration, the heat exchange member 10A will be described, and the description of the heat exchange member 10B will be omitted.

As illustrated in FIG. 3, the heat exchange member 10A includes a plurality of fins having a high thermal conductivity and a plurality of heat exchange tubes 10b that penetrate the fins 10a. The fins 10a as illustrated in the figure have a thin plate shape, and are arranged such that their surfaces are substantially parallel to the extending direction of an air passage (a direction indicated by an arrow A in FIG. 3). The plurality of fins 10a are arranged in parallel and arranged at intervals in a direction substantially orthogonal to the extending direction of the air passage (the direction indicated by the arrow A in FIG. 3). The fins 10a have a thin plate shape and can thus reduce a pressure loss of the entire heat exchange member 10A. However, the shape of each of the fins 10a is not limited to the thin plate shape. For example, as the fin 10a, a tube, a corrugated plate, or a perforated metal may be applied. The shape of the fins is appropriately selected depending on the intended use. The shape of the surface of the fin 10a is not limited to a specific one, and varies depending on the intended use, that is, any of various shapes, such as a smooth surface, an irregular surface, and a surface having fine holes, is selected as appropriate depending on the intended use.

In order to increase the efficiency of heat exchange, it is preferable that the fins be made of metal having a high thermal conductivity. As the metal having a high thermal conductivity, for example, silver, copper, gold, aluminum, and steel are present. In the case where the thermal conductivity of the metal is 50 (W/m·K) or higher, heat exchange is performed with high efficiency. Practically speaking, it is preferable that the metal be aluminum, an aluminum alloy, copper, or a copper alloy from the viewpoint of the price of the material.

The heat exchange tubes 10b are connected to the fins 10a. The inside of each of the heat exchange tubes 10b is supplied with a cooling medium or a heat medium. Preferably, the heat exchange tube 10b should be made of metal having a high thermal conductivity, as well as the fins 10a.

The number of heat exchange members 10A and 10B is not limited to two, though two heat exchange members are illustrated in the figure. For example, three or more heat exchange members may be provided. The number of fins 10a included in the heat exchange members 10A and 10B and the number of heat exchange tubes 10b included in the heat exchange members 10A and 10B are not limited to the numbers of the heat exchange members and the heat exchange tubes as illustrated in the figure, and are determined as appropriate depending on the intended use.

The refrigerant supply source 11 supplies a cooling medium having a temperature of 28 degrees Celsius, for example. The heat medium supply source 12 supplies a heat medium of 80 degrees C., for example. The refrigerant supply source 11 is connected to the heat exchange tubes 10b of the two heat exchange members 10A and 10B by respective refrigerant branch pipes 11a. The heat medium supply source 12 is connected to the heat exchange tubes 10b of the two heat exchange members 10A and by respective heat medium branch pipes 12a. At the refrigerant branch pipes 11a and the heat medium branch pipes 12a, respective three-way valves 14 are provided. The opening and closing of the three-way valves 14 are controlled by a controller not illustrated.

In the dehumidifier 100 of Embodiment 1, the dehumidification elements 1 are fixed onto the surfaces of the fins 10a and arranged such that dehumidification elements 1 are dotted as illustrated in FIGS. 2 and 3. The dehumidification elements 1 may be fixed onto both surfaces of each of the fins 10a and be arranged such that they are dotted, or may be fixed onto only one surface of each fin 10a such that they are dotted. In a method of fixing the dehumidification elements 1 to the surface of the fin fixing members 4 are adhered to the surface of the fin 10a as illustrated in FIG. 4 and the binders 3 of the dehumidification elements 1 are adhered to the fixing members 4, and thereafter, the fixing members 4 are dried and cured. It should be noted that the binders 3 included in the dehumidification elements 1 and the fixing members 4 adhered to the surface of the fin 10a are made of the same material.

Since the dehumidification elements 1 are arranged such that they are dotted, between adjacent ones of the dehumidification elements 1, voids S are provided as spaces. The void S as illustrated in FIG. 4 is provided between adjacent dehumidification elements 1, which are not in direct contact with each other. In the case where part of one of adjacent dehumidification elements 1 is in contact with part of the other, a void S is provided between the other part of the above one dehumidification element 1 and the other part of the above other dehumidification element 1, which are not in contact with each other.

In the dehumidifier 100, when absorbing moisture, the hygroscopic materials 2 expand, and the volume of each dehumidification element 1 thus increases. However, because of provision of the voids S between the adjacent dehumidification elements 1, interference between the dehumidification elements 1 is reduced, and stress between the dehumidification elements 1 is thus reduced. As a result, it is possible to reduce the probability that the dehumidification element 1 will fall off the surface of the fin 10a or will be damaged.

In order to reduce interference between the adjacent dehumidification elements 1, preferably, each of the dehumidification elements 1 should be formed in the shape of a bale and have a particle size of approximately 0.1 to 1.5 mm. When the volume of the dehumidification element 1 changes by 10% at the time of moisture absorption, the particle size of the dehumidification element 1 changes by approximately 0.01 to 9.15 mm. That is, in the dehumidification element 1 having the above size, at the time of moisture absorption, the amount of displacement of the dehumidification element 1 is small and the stress is also small, and thus, the dehumidification element 1 is not easily damaged. It should be noted that although the size of the dehumidification element 1 may be set to any size, it is preferable that the dehumidification element 1 be made small, because the amount of displacement of the small dehumidification element 1 at the time of moisture absorption can be reduced to a small value. In a configuration known as the related art, in which a hygroscopic material formed in the shape of a film is adhered and fixed to the entire surface of a fin whose short side has a length of approximately 10 mm, the hygroscopic material changes by approximately 1 mm at the time of moisture absorption.

The shape of the dehumidification element 1 is not limited to the shape of a bale, and may be a polygonal shape, a conical shape, or a spherical shape, for example. In the case where the dehumidification elements 1 are formed to have any of those shapes, the voids S can be easily formed between adjacent ones of the dehumidification elements 1.

Furthermore, it is preferable that the dehumidification element 1 be formed in the shape of a pellet and the surface of the pellet be irregular as illustrated in FIG. 5, (*a*) to FIG. 5, (*c*). FIG. 5, (*a*), illustrates a shape obtained by combining four leg portions having a truncated cone. FIG. 5, (*b*), illustrates a polyhedron. FIG. 5, (*c*), illustrates a shape obtained by providing a plurality of protrusion portions at the surface of a sphere. In the case where each of the dehumidification elements 1 is formed to have an irregular surface, the surface area can be increased, thereby increasing the area of each of voids S formed between adjacent ones of the dehumidification elements 1. That is, in the dehumidifier 100, the contact area between the dehumidification elements 1 and air to be treated that flows along the surfaces of the fins 10*a* of the heat exchange members 10A and 10B is increased, and the dehumidification performance is thus improved. The irregular surface of the dehumidification element 1 is not limited to the shapes as illustrated in FIG. 5, (*a*) to FIG. 5, (*c*), and may be another shape.

The fixing members 4 may be made of material different from the material of the binders 3. It is preferable hat the binders 3 be made of material that can join the plurality of hygroscopic materials 2 together and has elasticity and flexibility that enable the binders 3 to easily follow changes in volume of the hygroscopic materials 2. In contrast, since each of the fixing members 4 is bonded to the fin 10*a* the fixing member 4 may be made of material that can be chemically bonded to the fin 10*a* or material that can be chemically bonded to the fin 10*a* via a compound, not material that can merely be physically fixed to the fin 10*a*. In such a manner, by selecting the fixing member 4 made of material suitable for the intended use at a position at which the fixing member 4 is used, it is possible to hold a bonded state between the fin 10*a* and the dehumidification elements 1 for a long period of time, and thus to obtain a stable moisture absorption performance.

Next, the operation of the dehumidifier 100 will be described with reference to FIG. 2. First, in the dehumidifier 100, the controller not illustrated controls the three-way valves 14 provided at the refrigerant branch pipes 11*a* and the three-way valves 14 provided at the heat medium branch pipes 12*a*, to thereby cause refrigerant to flow through the heat exchange tubes 10*b* of the heat exchange member 10A, and cause a heat medium to flow through the heat exchange tubes 10*b* of the heat exchange member 10B. Then, air to be treated is caused to flow over the surfaces of the fins 10*a* of the heat exchange member 10A through which the refrigerant is caused to flow. As a result, moisture in the air is adsorbed by the dehumidification elements 1 fixed to the surface of the heat exchange member 10A, and the air is thus dehumidified. At this time, the temperature of the dehumidification elements 1 rises due to the exothermic reaction of the adsorption, but is prevented from excessively rising, since the dehumidification elements 1 are cooled by the refrigerant that flows through the heat exchange tubes 10*b* of the heat exchange member 10A. In such a manner, since the temperature of the dehumidification elements 1 is prevented from excessively rising, a high adsorption efficiency is maintained. In contrast, the dehumidification elements 1 fixed to the surface of the heat exchange member 10B, through which a heat medium flows, are heated, whereby moisture is desorbed, and the dehumidification elements 1 are regenerated.

After the elapse of a certain time period, the controller re-controls the three-way valves 14 provided at the refrigerant branch pipes 11*a* and the three-way valves 14 provided at the heat medium branch pipes 12*a*, to thereby cause the heat medium to flow through the heat exchange tubes 10*b* of the heat exchange member 10A, and cause the refrigerant to flow through the heat exchange tubes 10*b* of the heat exchange member 10B. Furthermore, the controller controls a damper not illustrated to switch the air passage for air to be treated, thus causing the air to flow over the surfaces of the fins 10*a* of the heat exchange member 10B, through which the refrigerant is caused to flow. In such a manner, the supply of the air to be treated, the supply of the refrigerant, and the supply of the heat medium to the heat exchange members 10A and 10B are alternately switched as described above, and the dehumidifier 100 can continuously dehumidify air to be treated.

Figure 6:
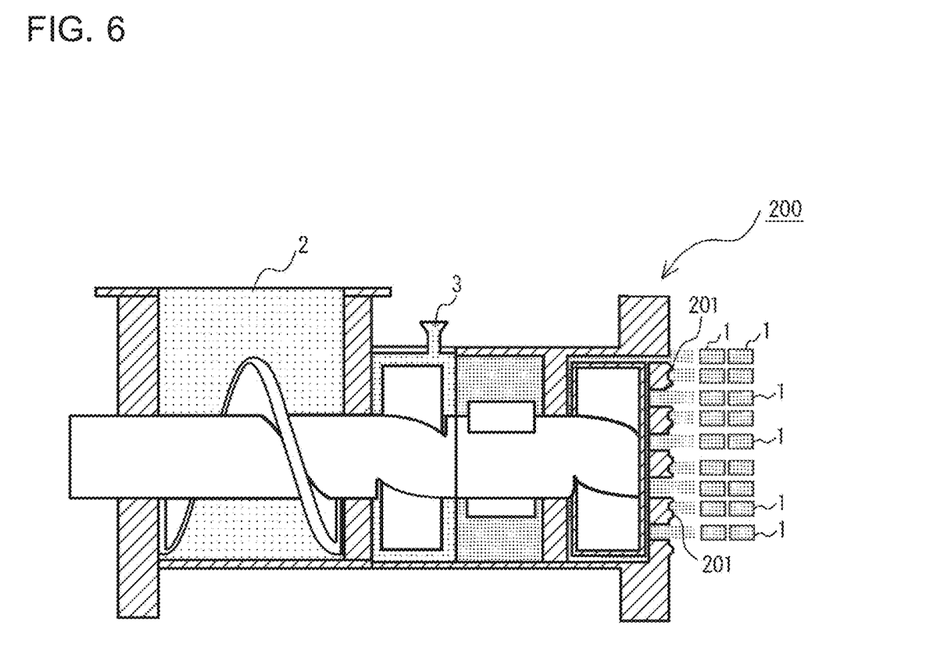
FIG. 6 is an explanatory view illustrating manufacturing equipment for use in production of the dehumidification elements according to Embodiment 1.

Next, a method of manufacturing the dehumidifier 100 including the dehumidification elements 1 according to Embodiment 1 will be described. FIG. 6 is an explanatory view illustrating manufacturing equipment for use in production of the dehumidification elements according to Embodiment 1. Manufacturing equipment 200 as illustrated in FIG. 6 produces the dehumidification elements 1 having a pellet shape. The manufacturing equipment 200 has an extrude-o-mix structure, for example.

First, the hygroscopic materials 2 having a fine particle shape or a fine fiber shape, the binder 3 that binds the hygroscopic materials together, and a solvent for use in adjustment of the viscosity are mixed together using the manufacturing equipment 200 as illustrated in FIG. 6. Next, a pressure is applied to the mixture of the hygroscopic materials 2, the binder 3, and the solvent, thus extruding the mixture from fine holes 201. Thereafter, the mixture is subjected to cutting, thereby molding a plurality of mixed bodies. Then, the molded mixed bodies are dried to produce dehumidification elements 1 having a pellet shape.

Next, as illustrated in FIG. 4, the fixing members 4 are adhered to the surfaces of the fins 10*a* included in the heat exchange members 10A and 10B. As examples of a method of adhering the fixing members 4 to the surfaces of the fins 10*a*, spraying, coating using a coater, and impregnation treatment are present. The coating using a coater enables the fixing members 4 to be uniformly adhered to the entire surfaces of the fins 10*a*, and also enables the adhesion amount of the fixing members 4 to be controlled. Thus, this coating using a coater is suitable as the above adhering method. As examples of the coating using a coater, coating using a roll coater, coating using a knife coater, and coating using a bar coater are present.

Lastly, the binders 3 of the dehumidification elements 1 are adhered to the fixing members 4, and the fixing members 4 are then dried and cured. As means to dry the fixing members 4, for example, hot air drying, infrared drying, or high frequency heating is selected and used as appropriate. It should be noted that a heating temperature and a time period for drying are arbitrarily set to a heating temperature and a time period that allow the fixing members 4 to be dried and fixed. The adhesive strength of the fixing members 4 may be increased by performing, for example, surface roughening processing or primer treatment on the surfaces of the fins 10a.

Although it is described above that the dehumidification elements 1 are produced using the manufacturing equipment 200 having the extrude-o-mix structure as illustrated, it is not limiting. The dehumidification elements 1 may be produced using, for example, an extrusion granulator, a fluidized bed granulator, an agitation granulator, or a tableting machine that has another structure. In addition, spray drying may be used as means to dry molded mixed bodies.

As described above, in order to arrange and fix the dehumidification elements 1 according to Embodiment 1 onto the surfaces of the fins 10a included in the heat exchange members 10A and 10B such that the dehumidification elements 1 are dotted, the dehumidification element 1 is configured such that the mixture of the hygroscopic materials 2 and the binder 3 is formed in the shape of a pellet. That is, in the dehumidification elements 1 arranged such that they are dotted, the voids S are provided between adjacent ones of the dehumidification elements 1, and thus, even when the volume of the hygroscopic materials 2 changes because of moisture absorption and moisture desorption, it is possible to reduce interference between the adjacent dehumidification elements 1. Furthermore, in the hygroscopic materials formed in the shape of a film that covers the entire surface of the fins, there is a possibility of a crack occurring due to changes in volume of the hygroscopic materials. However, the dehumidification elements 1 according to Embodiment 1 are formed in the shape of a pellet, and are small in profile, whereby even when the volume of the hygroscopic materials 2 changes, a crack does not easily occur. Therefore, the dehumidifier 100 including the dehumidification elements 1 can keep the dehumidification elements 1 fixed to the surfaces of the fins 10a, and can thus achieve a stable moisture absorption performance for a long period of time without lowering the moisture absorption performance even when moisture absorption and moisture desorption are repeated.

Embodiment 2

Figure 7:
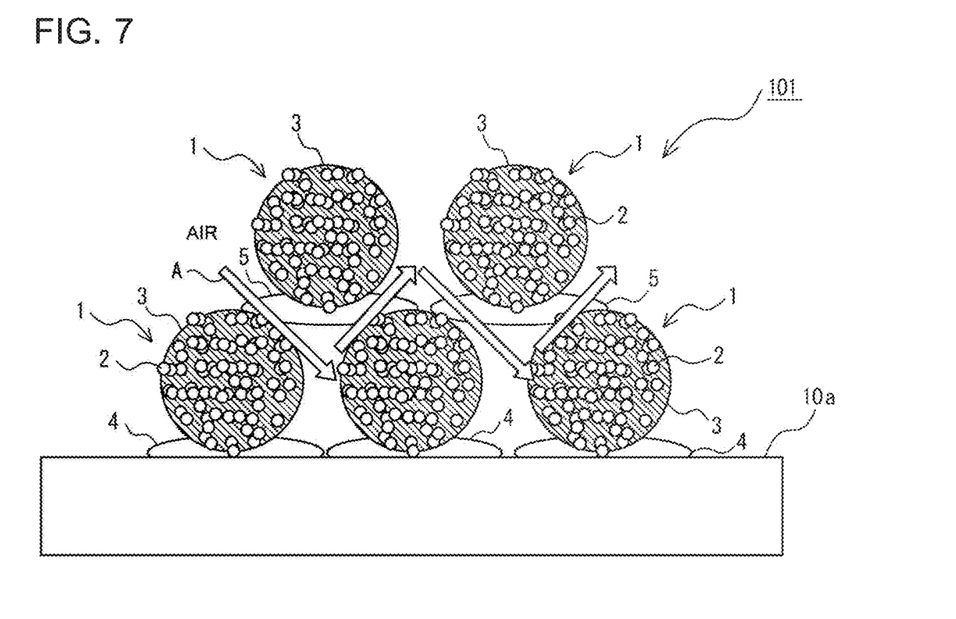
FIG. 7 is an enlarged view schematically illustrating a state in which dehumidification elements of a dehumidifier according to Embodiment 2 are fixed to the surface of the fin of a heat exchange member.

Next, a dehumidifier 101 of Embodiment 2 will be described with reference to FIG. 7. FIG. 7 is an enlarged view schematically illustrating a state in which dehumidification elements in the dehumidifier according to Embodiment 2 are fixed to the surface of the fin of the heat exchange member. It should be noted that structural elements that are the same as those in Embodiment 1 will be denoted by the same reference signs, and their descriptions will thus be omitted as appropriate. In the description concerning Embodiment 2, it is assumed that a side where the fin 10a is located is a lower side, and a side located away from the fin 10a is an upper side.

The dehumidification elements 1 in the dehumidifier 101 of Embodiment 2 have the same structure as the dehumidification elements 1 according to Embodiment 1. To be more specific, each of the dehumidification elements 1 according to Embodiment 2 includes the plurality of hygroscopic materials 2 and the binder 3, and is configured such that a mixture of the hygroscopic materials 2 and the binder 3 is formed in the shape of pellet. The plurality of hygroscopic materials 2 have a fine particle shape or a fine fiber shape and adsorb moisture in air. The binder 3 binds the plurality of hygroscopic materials 2 together.

As illustrated in FIG. 7, the dehumidifier 101 of Embodiment 2 is configured such that the dehumidification elements 1 are fixed to the surface of the fin 10a such that the dehumidification elements 1 are stacked in a plurality of layers, FIG. 7 illustrates an example in which the dehumidification elements 1 are arranged on the surface of the fin 10a such that they are dotted and stacked in two layers. The dehumidification elements 1 of the lower one of the two layers are fixed by the fixing members 4 adhered to the surfaces of the fins 10a of the heat exchange members 10A and 10B. The dehumidification elements 1 of the lower layer are arranged on the surface of the fin 10a such that they are dotted. The dehumidification elements 1 of the upper one of the above two layers are fixed by fixing members 5 adhered to upper surfaces of the dehumidification elements 1 of the lower layer. The dehumidification elements 1 of the upper layer are arranged on the upper surfaces of the dehumidification elements 1 of the lower layer such that they are dotted. It should be noted that in a step of fixing the dehumidification elements 1 of the lower layer to the fin 10a, the dehumidification elements 1 of the upper layer may be fixed to the upper surfaces of the dehumidification elements 1 of the lower layer. Alternatively, in a step different from the step of fixing the dehumidification elements 1 of the lower layer to the fin 10a, the dehumidification elements 1 of the upper layer may be fixed to the upper surfaces of the dehumidification elements 1 of the lower layer.

In the dehumidifier 101, the dehumidification elements 1 of the upper layer and the dehumidification elements 1 of the lower layer are arranged such that they are dotted, whereby voids S are provided between vertically adjacent ones of the dehumidification elements 1 and between laterally adjacent ones of the dehumidification elements 1. The binder 3 included in the dehumidification elements 1, the fixing members 4 adhered to the surfaces of the fins 10a, and the fixing members 5 adhered to the upper surfaces of the dehumidification elements 1 of the lower layer are made of the same material.

In the dehumidifier 101 of Embodiment 2, the dehumidification elements 1 are stacked in a plurality of layers on the surfaces of each of the fins 10a. It is therefore possible to increase the amount of fixation of the dehumidification elements 1 per unit area of the fin 10a and also in increase the amount of moisture absorption per unit area of the fin 10a. Furthermore, in the dehumidifier 101, each of the voids S is provided between associated upper and lower ones of the dehumidification elements 1. It is therefore possible to more effectively reduce the change in volume of the dehumidification elements and also the stress between the dehumidification elements, because of provision of the voids S. In addition, in the dehumidifier 101, since air to be treated passes through the voids S as indicated by arrows A in FIG. 7, the contact area between the hygroscopic materials 2 and air to be treated increases, thus improving the moisture absorption performance.

The configuration of the dehumidifier 101 of Embodiment 2 is not limited to the configuration as illustrated in FIG. 7, and the dehumidifier 101 may be configured such that the dehumidification elements 1 are arranged in three or more layers on the surfaces of the fins 10a such that they are dotted, for example.

Embodiment 3

Next, each of dehumidification elements 1A according to Embodiment 3 will be described with reference to FIG. 8.

Figure 8:
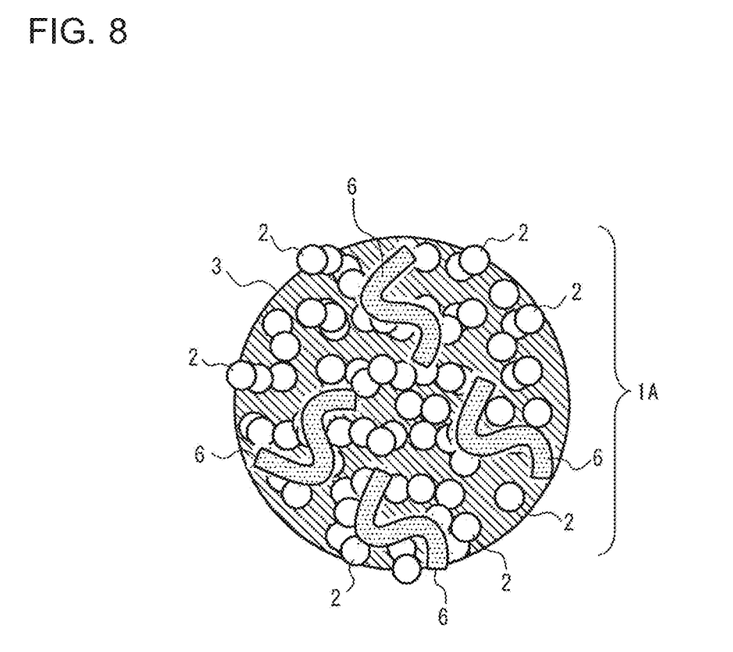
FIG. 8 is an explanatory view schematically illustrating a dehumidification element according to Embodiment 3.

FIG. 8 is an explanatory view schematically illustrating the dehumidification element according to Embodiment 3. Regarding Embodiment 8, structural elements that are the same as those in Embodiment 1 will be denoted by the same reference signs, and their descriptions will thus be omitted as appropriate.

The dehumidification element 1A according to Embodiment 3 includes fillers 6 in addition to the structural elements of the dehumidification element 1 of Embodiment 1. The fillers 6 are each a filling material that is added to and mixed with the structural elements, to thereby increase the thermal conductivity. That is, the dehumidification element 1A is configured such that a mixture of the hygroscopic materials 2, the binder 3, and the fillers 6 is formed in the shape of a pellet.

In order to improve the strength of the dehumidification element 1A, preferably, the fillers 6 should have a fiber shape. However, the fillers 6 may be granulated, for example. Furthermore, from the viewpoint of adhesive strength, etc., it is preferable that the material of the fillers 6 be ceramic. However, for example, metal, silicon carbide, or graphite may be used as the material of the fillers 6. In the case where the fillers 6 are made of material having a higher thermal conductivity than the binder 3, the fillers 6 can also play a role of increasing the thermal conductivity.

A step of producing the dehumidification elements 1A is the same as the above step of producing the dehumidification elements 1. To be more specific, the hygroscopic materials 2 which have a fine particle shape or a fine fiber shape, the binder 3 which binds the hygroscopic materials 2 together, the solvent for adjustment of the viscosity, and the fillers 6 are mixed together. After a pressure is applied to the mixture of the hygroscopic materials 2, the binder 3, the solvent, and the fillers 6, the mixture is subjected to cutting and a plurality of mixed bodies are molded. Then, the mixed bodies are dried, thereby producing dehumidification elements 1A each formed in the shape of a pellet.

The dehumidification element 1A according to Embodiment 3 includes the fillers 6 to increase the thermal conductivity, and is configured such that the mixture of the hygroscopic materials 2, the binder 3, and the fillers 6 is formed in the shape of a pellet. Therefore, in the dehumidifier 100 including the dehumidification elements 1A, it is possible to increase the efficiency of cooling and heating that are performed by the heat exchange members 10A and 10B, and thus improve the moisture absorption performance.

It is also possible that the dehumidification elements 1A according to Embodiment 3 are fixed to the surfaces of the fins 10a such that the dehumidification elements 1A are stacked in a plurality of layers as described regarding Embodiment 2. The dehumidification elements 1A according to Embodiment 3 may be combined with the dehumidification elements 1, and for example, may be fixed to the surfaces of the fins of the dehumidifier 100 of Embodiment 1 or the dehumidifier 101 of Embodiment 2, for example.

Regarding the embodiments, the above descriptions concerning the methods of manufacturing the dehumidifiers (100, 101), the dehumidification elements (1, 1A), and the dehumidifiers (100, 101) including the dehumidification elements (1, 1A) are not limiting. For example, the configurations of the dehumidifiers (100, 101) are not limited to the configurations thereof as illustrated in the figures, and the dehumidifiers (100, 101) may include other structural elements. Furthermore, the configurations of the heat exchange members 10A and 10B are not limited to the configuration thereof as illustrated in the figures. In short, regarding the methods of manufacturing dehumidifiers (100, 101), the dehumidification elements (1, 1A), and the dehumidifiers (100, 101) including the dehumidification elements (1, 1A), design changes and applications which are ordinarily made by a person with ordinary skill in the art may be variously made without departing from the technical concept.

REFERENCE SIGNS LIST 1, 1A: dehumidification element, 2: hygroscopic material, 3: binder, 4, 5: fixing member, 6: filler, 10A, 10B: heat exchange member, 10a: fin, 10b: heat exchange tube, 11: refrigerant supply source, 11a: refrigerant branch pipe, 12: heat medium supply source, 12a: heat medium branch pipe, 13: partition member, 14: three-way valve, 100, 101: dehumidifier, 200: manufacturing equipment, 201: fine hole, S: void.

The invention claimed is:

1. A method of manufacturing a dehumidifier including a heat exchanger including a metal fin, the method comprising:
mixing hygroscopic materials and a binder together, the hygroscopic materials having a particle shape or a fiber shape, the binder binding the hygroscopic materials together;
molding a plurality of mixed bodies by applying pressure to a mixture of the hygroscopic materials and the binder and by cutting the mixture into the plurality of mixed bodies;
producing dehumidification elements each in the shape of a pallet, by drying the plurality of mixed bodies; and
arranging the dehumidification elements on a metallic surface of the metal fin such that the dehumidification elements are dotted, and fixing the dehumidification elements to the metallic surface of the metal fin by fixing the binder to a support structure adhered to the metallic surface of the metal fin, with the metallic surface of the metal fin partially exposed.

2. Dehumidification elements arranged on a metallic surface of a metal fin and included in a heat exchanger such that the dehumidification elements are dotted, each of the dehumidification elements being fixed to the metallic surface of the metal fin by a support structure adhered to the metallic surface of the metal fin, with the metallic surface of the metal fin partially exposed, and comprising:
a plurality of hygroscopic materials having a particle shape or a fiber shape; and
a binder which binds the plurality of hygroscopic materials together,
wherein a mixture of the plurality of hygroscopic materials and the binder is in the shape of a pellet.

3. The dehumidification elements of claim 2, wherein a surface of the pellet is an irregular surface.

4. The dehumidification elements of claim 2, each further comprising a filler to increase a thermal conductivity,
wherein a mixture of the plurality of hygroscopic materials, the binder, and the filler is in the shape of a pellet.

5. A dehumidifier comprising:
dehumidification elements, including:
a plurality of hygroscopic materials having a particle shape or a fiber shape, and
a binder which binds the plurality of hygroscopic materials together, a mixture of the plurality of hygroscopic materials and the binder is in the shape of a pellet; and
a heat exchanger including a metal fin, wherein the dehumidification elements are on a surface of the metal fin such that the dehumidification elements are dotted, wherein the dehumidification elements are fixed to the surface of the metal fin, and wherein a metallic surface of the metal fins is partially exposed.

6. The dehumidifier of claim 5, wherein the dehumidification elements are fixed to the surface of the metal fin such that the dehumidification elements are stacked in a plurality of layers.

7. The dehumidifier of claim 5, wherein each of the dehumidification elements is fixed to the surface of the metal fin by a support structure made of a material different from a material of the binder.

* * * * *